Aug. 30, 1938.     LA MOINE WRIGHT     2,128,448
DRINKING STRAW
Filed Aug. 24, 1937
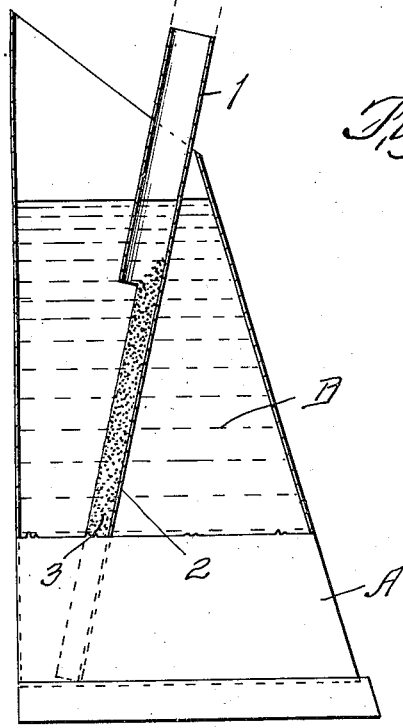
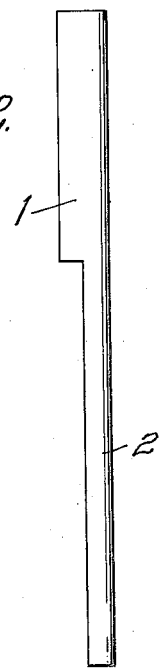
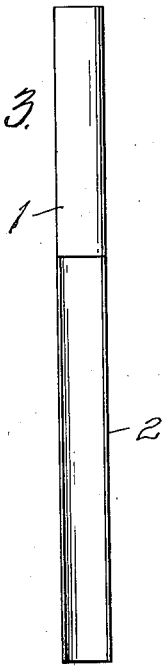
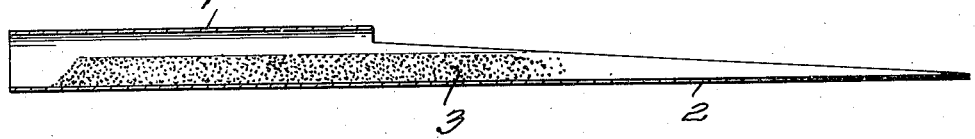
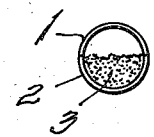
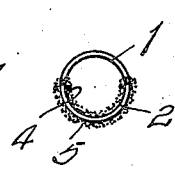
INVENTOR:
LaMoine Wright.
BY
ATTORNEY.

Patented Aug. 30, 1938

2,128,448

UNITED STATES PATENT OFFICE 2,128,448

DRINKING STRAW

La Moine Wright, Akron, Ohio

Application August 24, 1937, Serial No. 160,664

3 Claims. (Cl. 99—137)

The present invention relates to drinking straws adapted to be used in connection with a suitable container such, for instance, as a liquid container shown in my co-pending application Serial Number 132,273, filed March 22, 1937, an ordinary drinking glass, soda-water glass, beverage bottle, or any other similar container containing liquid, flavored, or unflavored.

The primary object of the present invention is to provide a drinking straw having a flexible blade like projection at one end thereof adapted to support a quantity of frozen material such, for instance, as ice-cream, of any desired flavor, either frozen hard or loosely packed thereon, or any other suitable soluble flavoring material capable of adhering thereto, so that when the blade section is emerged in liquid and stirred, the liquid will readily become flavored for withdrawal from its container through the tubular drinking straw section of the article in the usual manner.

Other objects of the invention are to provide an article of the class mentioned which will be comparatively simple and inexpensive in the cost of manufacture, wherein flavoring material frozen on, packed on, or otherwise adhering to the blade section projecting from the drinking straw section of the article, is exteriorly exposed to liquid to be withdrawn from its container, and, wherein, the blade section can be used as a liquid agitator to stir the liquid if more rapid dissolving of material on the drinking straw blade is desirable for flavoring the liquid.

All of the above and still further objects and advantages of the present invention will appear and become apparent from a study of the following specification read in connection with the accompanying drawing, wherein like characters of reference denote similar parts throughout the several views, and wherein:—

Fig. 1 is a view showing my improved drinking, liquid flavoring and cooling straw in a container of liquid, and the straw is shown in longitudinal section with a flavoring material on one section thereof and its extremity exposed to the liquid.

Fig. 2 is a side elevation of the drinking straw.

Fig. 3 is a side elevation of the drinking straw at a right angle to the view shown in Fig. 2.

Fig. 4 is a longitudinal section of a drinking straw with a modified blade section.

Fig. 5 is an end view looking from the drinking end thereof of the straw.

Fig. 6 is an end view looking from the blade end of the straw.

Fig. 7 is a view looking from the blade end of the straw and showing soluble flavoring material both upon the inside and outside of the blade section of the article.

Referring to the drawing, the article comprises a tubular drinking straw section designated 1, and a semi-tubular blade section 2 integral with the drinking straw section 1. The two sections may be of any length relative to each other, and the article may be made from any tasteless or odorless material, such for instance, as the usual material from which drinking straws are made, or from any other suitable material; the drinking straw section may be of any desired diameter, and, if desired, the side edges of the blade section 2 may be gradually inclined from its free end toward the drinking section 1, as shown in Fig. 4, so as to be more flexible than section 1.

The frozen, or other liquid flavoring material, as hereinbefore mentioned, is designated 3, it is supported by the blade section 2, and it may be of any desired thickness thereon. The flavoring material 3 can be formed on, or applied to, the blade section 2 of the article in any suitable manner so as to be supported thereby and readily removable therefrom, such as being dissolved in liquid to be flavored thereby, and such liquid may be any of the known beverages, soda-water, or even plain water, if desired to flavor the same. The blade 2 serves also as an agitator for stirring the liquid to more quickly dissolve the flavoring material on the blade projection of the drinking straw.

The blade section 2 being more flexible than the drinking straw section 1, it is easily bendable by applying downward pressure thereon to shorten same and permit the drinking straw end of the article to be inserted further into the container as the liquid in the container is consumed.

If flavoring material which will dry is applied to the blade section of the drinking straw, such, for instance, as syrup used at all soda fountains, flavoring extracts, fruit juices and ice-cream solutions which can be frozen, either or both sides of the blade section 2 of the article may be so provided therewith as indicated in Fig. 7 by the reference characters 4 and 5, and when the blade section is inserted into a glass, bottle, or other container A having liquid B therein, the soluble flavoring material 3 thereon will dissolve in the liquid, more rapidly, of course, if the liquid is stirred or agitated by the blade section 2, and, as understood, the flavored liquid can be drawn from the container through the drainking straw end 1 of the article in the usual manner.

If desired, the frozen material can be formed or applied to the inner wall of the tubular or drinking straw end 1 of the article continuous with the blade section 2 of the article, as shown in Fig. 4.

Where any frozen material, such as ice-cream or sherbet, of any flavor, is applied to the blade section 2 of the article, warm bottled beverages or liquid, is readily cooled thereby, and the liquid is drawn from the container through the drinking straw end 1 of the article. This is highly desirable where cold beverage or liquid is not obtainable.

The many advantages and novel features of the hereindescribed invention, it is believed, will readily suggest themselves to those skilled in the art to which it appertains.

While I have herein described the preferred embodiment of the invention, it is, of course, understood that minor changes in the construction, arrangement and combination of parts may be made, wherein they do not involve the exercise of invention and fairly fall within the scope of the appended claims.

What I claim is:

1. A drinking straw comprising a tubular body section and a semi-tubular opposite body section, and a frozen soluble material on the inner wall of the semi-tubular body section for flavoring and cooling liquid to be drawn from a container through the tubular body section.

2. A drinking and liquid flavoring straw formed from a drinking straw of ordinary construction with a portion of the straw cut away longitudinally to form a channel adapted to be filled with a frozen soluble material therein for cooling and flavoring liquid to be drawn through the non-cut-away portion.

3. An article of the class described comprising a tubular portion and a semi-tubular portion, said semi-tubular portion having a flavoring material on the inner and outer walls thereof for flavoring liquid in a container drawn through the tubular body portion.

LA MOINE WRIGHT.